United States Patent [19]

Jansson

[11] 4,399,616

[45] Aug. 23, 1983

[54] TELESCOPING MEASURING RULE

[75] Inventor: Elis Jansson, Ludvika, Sweden

[73] Assignee: Olle Humble, Lidingo, Sweden

[21] Appl. No.: 309,118

[22] Filed: Oct. 6, 1981

[30] Foreign Application Priority Data

Oct. 17, 1980 [SE] Sweden ............................. 8007306

[51] Int. Cl.³ ................................................ G01B 3/08
[52] U.S. Cl. ...................................... 33/161; 33/451;
33/494
[58] Field of Search .................. 33/161, 334, 342, 451,
33/464, 483, 494

[56] References Cited

U.S. PATENT DOCUMENTS

| | | | |
|---|---|---|---|
| 149,532 | 4/1874 | Sherwin | 33/161 |
| 844,536 | 2/1907 | Prindle | 33/161 |
| 1,028,507 | 6/1912 | Voggenreiter | 33/161 |
| 1,338,176 | 4/1920 | Finstrom | 33/161 |
| 1,488,482 | 4/1924 | Eckman | 33/161 |
| 1,623,897 | 4/1927 | Williams | 33/161 |
| 1,848,003 | 3/1932 | Chalupny | 33/161 |
| 2,270,227 | 1/1942 | Swanson | 33/161 |
| 2,270,355 | 1/1942 | Swanson | 33/161 |
| 3,492,737 | 2/1970 | Swanson | 33/161 |
| 3,526,040 | 9/1970 | Young | 33/161 |

FOREIGN PATENT DOCUMENTS

| | | | |
|---|---|---|---|
| 2601240 | 7/1977 | Fed. Rep. of Germany | 33/161 |
| 572833 | 6/1924 | France | 33/161 |
| 347362 | 8/1960 | Switzerland | 33/161 |

*Primary Examiner*—Richard R. Stearns
*Attorney, Agent, or Firm*—Young & Thompson

[57] ABSTRACT

A measuring rule consists of a plurality of sections which can be displaced telescopically relative to each other and have a first scale for outside measurement which begins at zero at the outer end of one end section. Said sections also have a second scale for inside measurement which begins at the outer end of one end section with a value equal to the length of the measuring rule when the sections are fully contracted.

6 Claims, 9 Drawing Figures

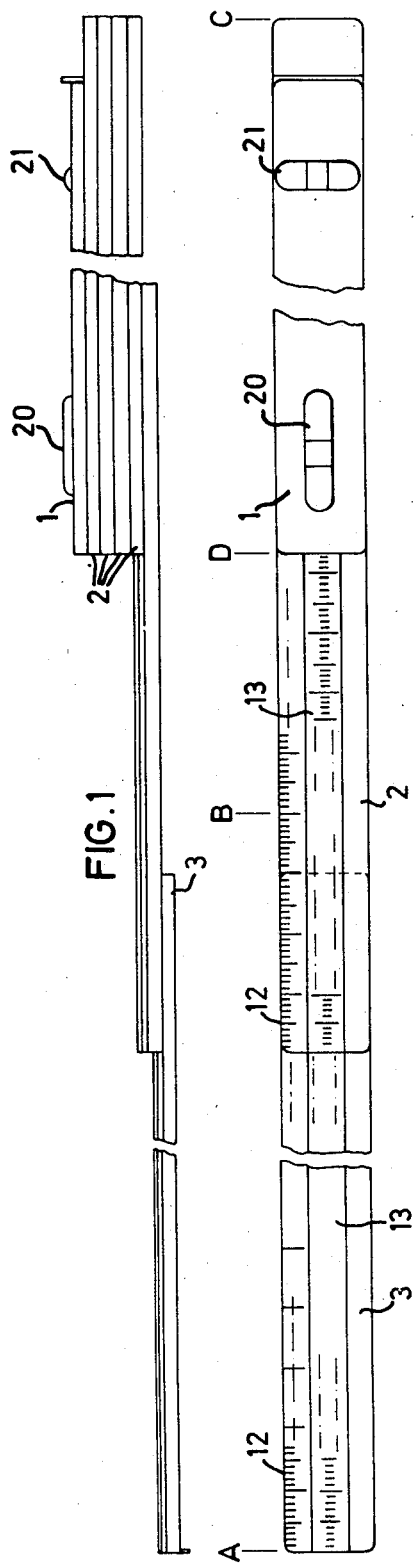
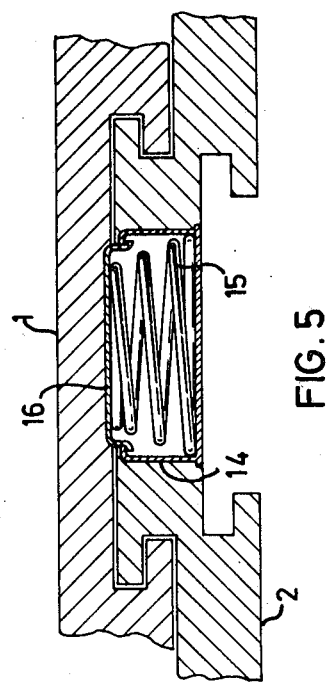

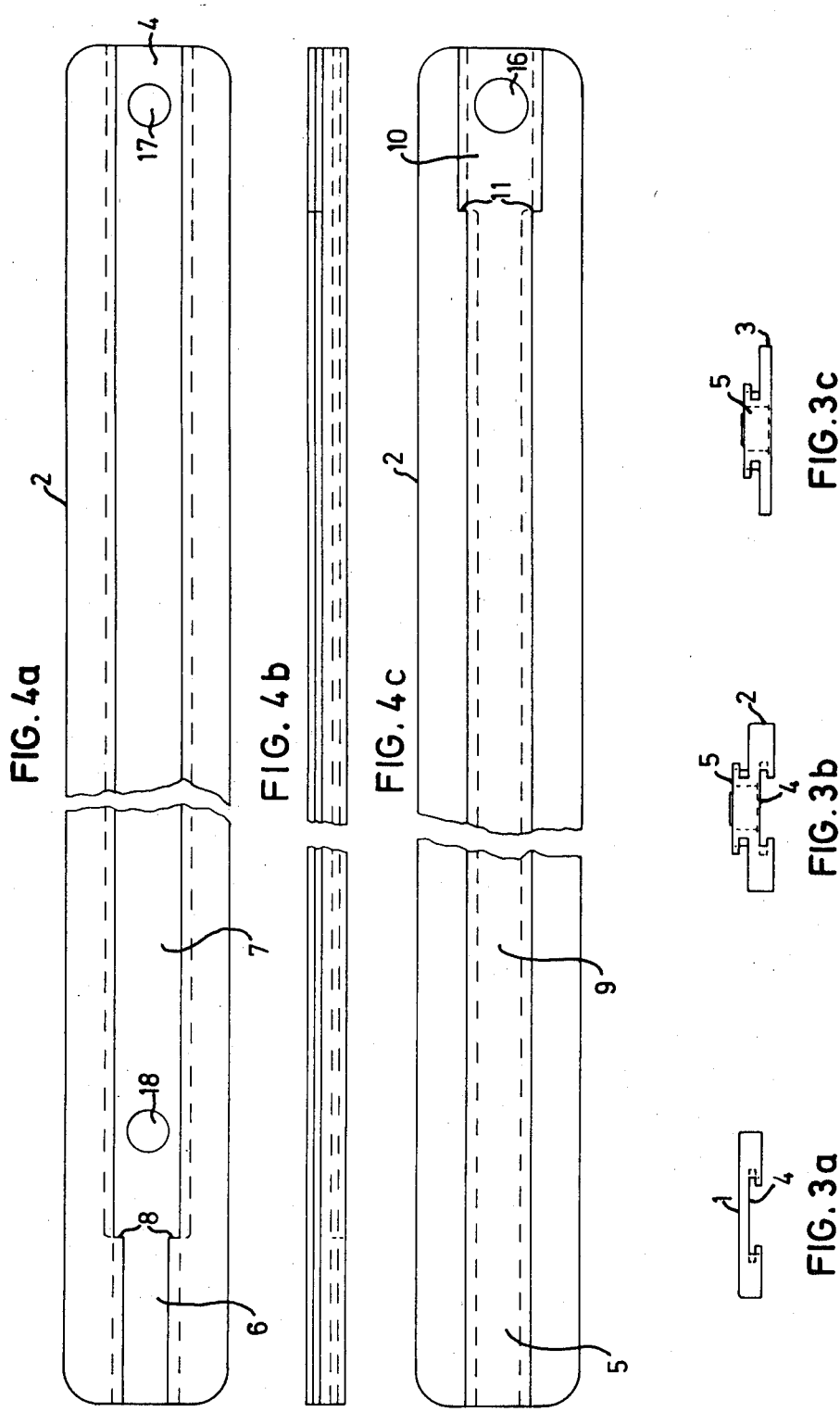

TELESCOPING MEASURING RULE

The present invention relates to a telescoping measuring rule comprising a plurality of slidably interconnected staff-shaped sections, which can be displaced relative to each other in their longitudinal directions to vary the length of the measuring rule, abutments being arranged to determine the maximum relative displacement in one direction between interconnected sections.

By far the most common measuring rule used today is the folding rule, consisting of a number of flat links which are flexibly jointed to each other. This type is quite suitable for outside measurements of various objects, but it cannot be used for making accurate inside measurements, e.g. of door or window openings or the like. Inside measurements can be made with tape rules which can be rolled up, but these have the disadvantage of not being very stiff, so that it is only possible to make shorter measurements without supporting the outer end of the tape.

Various types of telescoping measuring rules have been suggested to remove the above-mentioned disadvantages, but up to now none of these have achieved much popularity because they have been both bulky and have had unsatisfactory scale arrangements. For example, a known telescoping measuring rule uses a central body with two extension members, which can be extended from the central body independently of each other in opposite directions. The scale of one extension is a continuation of the scale on the central body, which permits direct reading of the total length, but if the other extension member is also used, the user must himself add the read scale value to obtain the total length. In another known telescoping measuring rule, the left-hand end section is graduated from left to right, while the extension sections are graduated from right to left. Both of these types are, however, easily misread.

The purpose of the present invention is to achieve a telescoping measuring rule which is simple in design, has an easily read scale arrangement both for outside and inside measurement, and is easy to use.

This is achieved by a telescoping measuring rule as described above which is characterized in that said sections have a first scale for taking outside measurements, the graduation thereof beginning at the outer end of an end section, the graduation of the other sections being a continuation of the graduation of the immediately preceding sections, and a second scale for taking inside measurements, the graduation of which begins at the outer end of an end section with a value equal to the length of the measuring rule when fully contracted, said second scale being placed so that the measurement can be read against the end edge of the next following section.

Since it is difficult to adjust the rule by eye so as to be perfectly horizontal or vertical in taking an inside measurement, in a preferred embodiment, at least one of the sections is provided with a level.

The invention will be described in more detail below with reference to an example shown in the accompanying drawings.

FIG. 1 is a side view of a measuring rule according to the invention,

FIG. 2 is a plan view of the measuring rule in FIG. 1,

FIGS. 3a, b and c are end views of a top section, an intermediate section and a bottom section respectively, FIGS. 4a, b and c show the intermediate section as seen from below, from the side and from above respectively, and FIG. 5 is a cross-sectional view of the top section and an intermediate section.

The measuring rule shown in FIGS. 1 and 2 consists of a number of flat sections of rectangular cross section, more specifically a top section 1, five intermediate sections 2 and a bottom section 3. The top section 1 has a T-shaped groove 4, and the bottom section 3 has a T-shaped guide 5 of corresponding cross section. The intermediate sections 2 have both a groove 4 and a guide 5, as can be seen in FIGS. 4a, b and c, so that sections 1-3 can be slidably interconnected in the manner shown most clearly in FIG. 5.

In the embodiment shown, the bottom section 3 is intended to be extended first to the left relative to the other sections, which are then extended one by one to the left relative to the section lying above it, until the desired total length is obtained. To limit relative displacement between the sections in this direction, the grooves 4 are made with a narrow portion 6 and a wide portion 7, the transition between these portions forming abutment surfaces 8. In a corresponding manner, the guides 5 are made with a narrow portion 9 and a wide portion 10, forming abutment surfaces 11 between them. When two interconnected sections are maximally extended, so that the abutment surfaces 8 and 11 abut against each other, there is an overlap, the length of which is equal to the sum of the length of the groove portion 6 and the guide portion 10. The length of these portions is selected so as to provide sufficient stiffness.

The measuring rule is provided with a first scale 12 which is continuous from the outer end of the bottom section 3 to the outer end of the top section 1. The scale begins at zero and has a continuous graduation from left to right, by virtue of the fact that each scale portion on each section is graduated from left to right and is a direct continuation of the scale on the immediately preceding section, when the sections are fully extended. The first scale 12 is intended for outside measurement, and therefore the scale markings extend out to the side edge of the sections. Thus the measure A-B in FIG. 2 is read directly at B.

To read inside measurements, there is a second scale 13 inside the scale 12. Scale 13 also begins at the outer end of the bottom section 3, and the scale portions on subsequent sections are a continuation of the scale on the immediately preceding section when the sections are fully extended. The scale on the bottom section 3 begins with a value which is equal to the length of the measuring rule when all of the sections are fully contracted. This means that it is possible to read an inside measurement directly by reading on the last extended section against the left-hand end edge of the immediately following section. The measure A-C in FIG. 2 is thus obtained by reading the scale 13 at D.

To prevent the interconnected sections 1-3 from being moved too easily out of their relative end positions, the wide portion 10 of the guides has a spring housing 14 containing a spring 15 and a cup 16 biased by the spring. The groove 4 is provided with a pair of shallow cavities 17, 18 which the cup snaps into to fix the sections in the fully contracted or fully extended positions, respectively. During the actual extension movement, the spring-biased cup 16 also acts as a brake.

To facilitate levelling of the measuring rule when measuring at places where there are no supporting surfaces, the end sections 1 and perferably also the end section 3 and an intermediate section 2 are each provided with a level, comprising a pair of vials 20 and 21 respectively, running longitudinally and transversely, respectively, to the section. Said vials are mounted in cavities in the upper surface of the sections.

What I claim is:

1. In a telescoping measuring rule, comprising a plurality of slidably interconnected staff-shaped sections, which can be displaced relative to each other in their longitudinal directions to vary the length of the measuring rule, and abutments to determine the maximum relative displacement in one direction between interconnected sections; the improvement in which said sections have a first scale for taking outside measurements, the graduation thereof beginning at the outer end of an end section, the graduation of the other sections being a continuation of the graduation of the immediately preceding sections, and a second scale for taking inside measurements, the graduation of which begins at the outer end of an end section with a lowest value equal to the length of the measuring rule when fully contracted, the graduation of the other sections being a continuation of the graduation of the immediately preceding sections, said second scale being placed so that the measurement can be read against the end edge of the next following section.

2. Measuring rule according to claim 1, characterized in that said sections consist of thin slats of rectangular cross section, which are slidably interconnected by means of longitudinal grooves which are widened at their bottoms, and guides which are correspondingly widened, whereby the slats can be slid together to form a stack with the top side of each slat facing the bottom side of the following slat, at least the second scale being inscribed on the top side of the slats beginning at the outer end of the bottom slat.

3. Measuring rule according to claim 2, characterized in that the second scale is placed centrally on the top of the slats, and that the first scale is placed beside the second scale and has scale markings which extend out to the side edge of the slats.

4. Measuring rule according to claim 2, characterized in that the grooves have a first shorter portion of smaller cross section and a second longer portion of larger cross section, and that the guides have a first portion with a cross section corresponding to said first portion of the grooves and a length equal to said second portion of the grooves, and a second portion with a cross section corresponding to said second portion of the grooves and a length equal to said first portion of the grooves.

5. Measuring rule according to claim 1, characterized in that spring means are arranged between the sections to increase the friction upon relative displacement and to fix the sections in their relative end positions.

6. Measuring rule according to claim 1, characterized in that at least one of the sections is provided with a level.

* * * * *